United States Patent
Casper et al.

(10) Patent No.: US 7,442,396 B2
(45) Date of Patent: Oct. 28, 2008

(54) DOUGH COMPOSITIONS HAVING A MOISTURE BARRIER, AND RELATED METHODS

(75) Inventors: Jeffrey L. Casper, Minneapolis, MN (US); Alan A. Oppenheimer, Savage, MN (US); Braden Erickson, Eden Prairie, MN (US)

(73) Assignee: General Mills Marketing, Inc., Minneapolis, MN (US)

( * ) Notice: Subject to any disclaimer, the term of this patent is extended or adjusted under 35 U.S.C. 154(b) by 559 days.

(21) Appl. No.: 10/903,981

(22) Filed: Jul. 30, 2004

(65) Prior Publication Data

US 2006/0024416 A1 Feb. 2, 2006

(51) Int. Cl.
*A21D 13/00* (2006.01)

(52) U.S. Cl. .................... 426/549; 426/94; 426/302; 426/305; 426/496

(58) Field of Classification Search ........... None
See application file for complete search history.

(56) References Cited

U.S. PATENT DOCUMENTS

| | | | |
|---|---|---|---|
| 4,293,572 A | | 10/1981 | Silva et al. |
| 4,375,484 A | * | 3/1983 | Lee et al. ............... 426/549 |
| 4,389,420 A | | 6/1983 | Yong et al. |
| 4,762,721 A | | 8/1988 | Holscher et al. |
| 5,965,180 A | | 10/1999 | Lonergan |
| 5,989,603 A | | 11/1999 | Lonergan et al. |
| 6,503,546 B1 | * | 1/2003 | Ferrari-Philippe et al. .... 426/94 |
| 6,579,554 B2 | | 6/2003 | Moder et al. |
| 2003/0044488 A1 | | 3/2003 | Roskam et al. |
| 2004/0096548 A1 | | 5/2004 | Stevens et al. |

OTHER PUBLICATIONS

Alistair M. Stephen, 1995, Food Polysaccharides and Their Applications, 195-197.

* cited by examiner

*Primary Examiner*—Lien Tran
(74) *Attorney, Agent, or Firm*—Dan Schulte; Arlene Hornilla

(57) ABSTRACT

Described are dough products that contain a hydrogel coating, wherein the hydrogel coating contains a hydrophilic colloid, oil, plasticizer, and water, and functions as a moisture barrier.

5 Claims, No Drawings

DOUGH COMPOSITIONS HAVING A MOISTURE BARRIER, AND RELATED METHODS

FIELD OF THE INVENTION

The invention involves dough products that include a dough composition having a moisture barrier at a surface.

BACKGROUND

Consumers have many set expectations of how food products will appear and taste upon baking. These consumers make choices based on factors such as the final texture, taste, color, and overall appearance of a cooked product. Baked dough products in particular are expected to exhibit distinct aesthetics, such as a crust color that is a desired shade and darkness, a desired shape, and a crust that does not contain excessive surface defects such as cracking, flaking, shredding, tearing, etc. An excessively dark, light, or off-color (e.g., grayish instead of brownish) crust may look unappealing, as may a misshapen dough product or a baked dough product having a crust that includes excessive cracking, tearing, shredding, flaking, etc.

Producers of commercial dough products continuously research dough formulations and preparation methods to find new, economical dough formulations and methods that result in dough products that can be baked to exhibit desired aesthetics. Just one example of a manner by which desired exterior (crust) properties can be modified, is to place an edible coating or film at a dough surface, which produces a desired result upon baking, such as a desired color or sheen.

Of course, other considerations are involved in the overall quality and desirability of a commercial dough product. A dough product must also have organoleptic (taste, smell, and texture) properties that will please the consumer. And product features such as storage stability and convenience of use are also favored. Many dough products today are designed to retain sufficient freshness to be baked following extended periods of refrigerated or frozen storage. Dough products that can in some instances be particularly desirable for dough manufactures and consumers alike include dough products that can be frozen and stored without first requiring a proofing step, and that can be baked from frozen without thawing or without proofing between the freezer and oven.

SUMMARY

The invention relates to dough compositions that include a moisture barrier at least over a portion of the surface of the dough. The moisture barrier has water-retaining capabilities that allow the moisture barrier to retain moisture (water) at temperatures experienced during a baking cycle. The moisture barrier at a surface of the dough composition causes the dough to also retain moisture during baking, while the dough expands during baking. The baked dough composition, because of the moisture retained at the dough surface during baking, exhibits improved features such as one or more of reduced surface defects (e.g., surface cracking, tearing, flaking, shredding, etc.), desired color (e.g., a desirable shade of brown and reduced gray), a higher baked volume, or a higher baked specific volume.

With regard to baked volume, a baked dough product of the invention, including a moisture barrier, can in certain embodiments bake to a larger volume compared to a dough that does not include the moisture barrier. At the same time, however, a baked dough product of the invention may or may not exhibit a higher baked specific volume. A moisture barrier can cause a dough piece, during baking, to retain more water compared to a dough piece without the moisture barrier. When this occurs, a dough product that exhibits an increase in baked volume may not necessarily also exhibit an increase in baked specific volume, because the baked dough can contain more water and have a greater mass, even if larger in volume. According to certain embodiments of baked dough products (e.g., refrigerated baked goods) a baked dough piece may exhibit an increased volume (relative to the same dough piece that does not include a moisture barrier) and also an increase in baked specific volume. In other embodiments (e.g., laminated dough pieces such as croissants) a moisture barrier may result in an increase in baked volume without an increase in baked specific volume (or possibly even with a decrease in baked specific volume).

In particular, a moisture barrier can be especially useful if the moisture barrier has particularly good water-retention properties, allowing the moisture barrier to retain moisture well into a baking cycle. Flexibility of a moisture barrier, which can result from water-retention, can also be important during baking. A water-retaining moisture barrier that remains flexible during a baking cycle can be particularly useful because a flexible moisture barrier material can expand along with the expansion that occurs with leavening of a dough composition during baking. Loss of flexibility too early during a baking cycle (e.g., during expansion of the dough piece) can result in a moisture barrier structure that is unduly rigid and that may cause cracking, shredding, flaking, or tearing of a dough surface, a restricted degree of expansion possibly resulting in a reduced baked volume or reduced baked specific volume, or both. A non-rigid, hydrated and flexible moisture barrier that expands during baking along with a dough composition, e.g., through maximum expansion, allows for continuous coverage of a dough surface by the moisture barrier. Coverage of a dough surface by a flexible and hydrated moisture barrier, during expansion of the dough product while baking, will cause the dough surface to also retain moisture. A moisture barrier can be considered to be hydrated as long as the moisture barrier material includes an amount of water that provides the moisture barrier with sufficient flexibility to expand along with an expanding dough product, and to retain moisture at a dough surface. Overall, the retained moisture at the dough surface, present due to the hydrated moisture barrier, can reduce the amount of cracking, shredding, flaking, or tearing, etc., that would otherwise result if the dough surface became dehydrated as the dough expands during baking, and can also increase the amount of total expansion to produce a higher baked volume.

Related to color, surface texture, and volume effects, of a dough piece that includes a moisture barrier according to the invention, a dough piece that includes a moisture barrier can exhibit such effects following extended periods of storage, e.g., refrigerated or frozen storage. Thus, the moisture barrier can allow a dough product to remain fresh through longer refrigerated or frozen storage periods, or increased amounts of temperature cycling such as freezing and thawing, while still exhibiting desired properties of color, surface texture, and baked volume. As one example, certain dough products according to the invention that include a moisture barrier can be subjected to multiple freeze-thaw cycles (e.g., 14 or more cycles between 0 degrees and 20 degrees Fahrenheit), following which the inventive dough product can exhibit overall appearance that is better than an identical dough product that does not include the moisture barrier—e.g., the dough piece that includes the moisture barrier can exhibit a color that is a desirable shade of brown, with less grayness compared to an otherwise similar dough piece that does not include the moisture barrier.

Certain specific embodiments of moisture barriers of the invention exhibit particularly useful moisture-retaining capabilities, flexibility, and aesthetic properties following baking. Embodiments of moisture barriers of the invention are formulated to remain hydrated and flexible through a portion of a baking cycle during which a dough product expands. Such a moisture barrier may remain flexible and hydrated through a portion of a baking cycle during which a dough piece expands (leavens) to a maximum volume, before the moisture barrier becomes dehydrated (dry) and rigid or inflexible. During the portion of the baking cycle at which the moisture barrier remains hydrated, the moisture barrier expands with the expanding dough product and causes moisture to remain at a surface of the dough piece, thereby improving the flexibility of the dough surface during baking and allowing the dough surface to stretch and expand with reduced cracking, flaking, shredding, tearing, etc. After the dough product has finished expanding, the flexibility and moisture-retaining properties of the moisture barrier are no longer important modes of preventing cracking or tearing, etc., at a dough surface, and the moisture barrier may at that time be allowed to lose any remaining amount of water present in the moisture barrier, after which only edible solids are left at the dough surface.

Embodiments of dough products of the invention include unbaked or partially-baked (raw) dough pieces, typically of a desired shape and size, that have at least a portion of a surface that includes a moisture barrier as described herein. Optionally, substantially all of an upper surface of a dough piece may include a moisture barrier, or an entire dough piece surface may be completely covered by a moisture barrier.

Embodiments of useful moisture barriers can include a combination of ingredients that include a hydrocolloid and other ingredients that together result in desired moisture-retaining properties and flexibility during baking, as described. In specific, an example of such a moisture barrier can include a hydrogel, e.g., prepared from a hydrocolloid and other ingredients such as plasticizer, a liquid or solid (e.g., plastic) oil (fat), optional starch, and water. Certain specific hydrocolloids have been found to be effective in preparing a hydrogel that exhibits moisture-retaining properties and flexibility as described, e.g., which result in one or more of reduced cracking, tearing, shredding, etc., of a dough surface upon baking; desired coloration of a baked dough surface (e.g., desired browning and reduced graying); and an increase in baked volume, water retention, or both. For example, the hydrocolloid agar has been found to be useful in preparing a hydrogel moisture barrier of the invention, as have other hydrocolloid materials such as locust bean gum, carrageenan, as well as mixtures of such hydrocolloids, e.g., mixtures of agar and locust bean gum and mixtures of agar, locust bean gum, and carrageenan.

Certain exemplary moisture barriers can take the form of an emulsion, e.g., an oil-in-water emulsion, wherein one phase is a hydrogel and another phase is an oil. Such an emulsion may be, for example, an oil-in-water emulsion that includes useful amounts of ingredients as described, e.g., from about 0.1 to about 1.5 or 2 weight percent hydrocolloid, from 0.5 to 20 weight percent plasticizer, from about 1 to about 20 weight percent oil, from 0.2 to 2 weight percent starch, and from about 55 to about 95 weight percent water.

According to certain specific embodiments of the invention, neither a hydrocolloid nor a moisture barrier needs to contain any protein (e.g., a hydrocolloid protein), and moisture barriers and hydrocolloids according to the invention may specifically exclude proteins. According to other embodiments, the moisture barrier can include hydrocolloid that consists of or consists essentially of agar; a combination of agar and locust bean gum; or a combination of agar, locust bean gum, and carrageenan.

The dough composition itself can be any dough composition, of any useful formulation, as desired and as benefits from the use of a moisture barrier as described, which may normally mean that the dough is stored at refrigerated or frozen conditions as a dough that has not been fully baked such that the dough experiences an amount of expansion during baking. For example, a useful dough composition may be an un-proofed or partially proofed, refrigerator or freezer-stable raw dough that expands (i.e., leavens) during baking by one or more of the effects of: entrapped gas such as bubbles or cells that contain entrapped carbon dioxide, entrapped oxygen, or both; a laminated dough structure; by action of chemical leavening agents, or by action of a biological leavening agent such as a yeast. The dough may alternately be partially proofed, or partially baked. For use according to the present description, an unproofed dough composition can be a dough composition that has not undergone any processing step that is designed to or that has allowed the volume of the dough to increase by more than 25 percent; e.g., an unproofed dough can be considered to have a raw specific volume in the range from 0.9 to 1.2 cubic centimeters per gram (cc/g). A partially-proofed dough can be considered to have a raw specific volume of from 1.2 to 1.9 cc/g. A pre-proofed dough can be considered to have a raw specific volume of greater than 1.9 cc/g.

According to particular embodiments, a dough product that includes a moisture barrier as described can be "freezer-to-oven" dough product that can be stored frozen in an un-proofed or partially-proofed state, and that can be placed frozen into an oven for baking to a useful baked volume, without a thawing or proofing step.

An example of a dough product of the invention can include a laminated dough product such as a croissant that includes a hydrogel coating as a moisture barrier. Normal dough products (e.g., croissants) that do not include a moisture barrier as described herein, can experience rapid surface dehydration during baking. Such rapid dehydration can result in undesirable effects at the surface during baking, such as tearing, shredding, flaking, or cracking, as well as undesirable color. A moisture barrier according to the invention can retain moisture at the dough surface during baking to inhibit such effects of dehydration. The moisture barrier, which can be in the form of a hydrogel solid at room temperature or refrigerated or frozen temperatures, can also function to maintain separation of packaged dough surfaces during refrigerated or frozen storage.

An aspect of the invention relates to a dough piece that includes a dough composition and a moisture barrier at a surface of the dough composition. The moisture barrier includes a hydrogel that exhibits hysteresis between a melting temperature and a setting temperature.

Another aspect of the invention relates to a dough piece that includes a dough composition and moisture barrier at a surface of the dough piece. The moisture barrier contains a hydrogel. The dough piece is capable of being baked with the moisture barrier remaining hydrated during baking at least until the dough piece achieves a maximum volume.

Yet another aspect of the invention relates to a method of preparing a dough composition. The method includes providing a dough piece; applying a moisture barrier to a surface of the dough piece; the moisture barrier comprising a hydrogel that includes hydrocolloid and water; and baking the dough piece to cause the dough piece to expand, wherein the moisture barrier remains hydrated during baking at least until the dough piece achieves a maximum volume during baking.

Yet another aspect of the invention relates to an edible moisture barrier composition that includes from 0.1 to 2.5 weight percent hydrocolloid selected from the group consisting of: agar and locust bean gum; and agar, locust bean gum, and carrageenan, from 2 to 20 weight percent plasticizer, from 0.2 to 2 weight percent starch, from 1 to 20 weight percent oil, and from 55 to 95 weight percent water.

DETAILED DESCRIPTION

A dough piece of the invention includes a moisture barrier at a surface of the dough piece, e.g., in the form of an edible film or coating that retains water and flexibility during baking. For example, a moisture barrier according to the invention can be formulated to remain hydrated and flexible through a portion of a baking cycle during which a dough product expands (i.e., leavens). Desirably, a moisture barrier of the invention may remain flexible and hydrated through a portion of a baking cycle during which a dough piece achieves maximum expansion (e.g., maximum volume), before the moisture barrier becomes dehydrated. While baking, a moisture barrier that remains hydrated and flexible can expand along with the expanding dough product, and can thereby cause moisture to remain at a surface of the dough piece to improve the flexibility of the dough surface during baking and allow the dough surface to stretch and expand with reduced cracking, tearing, flaking, etc., any of which can occur if a dough surface becomes dehydrated during expansion while baking. After a dough product has finished expanding, the flexibility and moisture-retaining properties of the moisture barrier are no longer important to retain moisture at a dough surface, and the moisture barrier may at that time be allowed to lose any remaining amount of water present in the moisture barrier, after which only an inflexible and rigid layer of edible solids is left at the dough surface.

The moisture barrier can be prepared from ingredients that include a hydrocolloid, and may include a composition known as a "hydrogel." A hydrogel can be considered to be a composition that includes a polymer (a "hydrocolloid") that is capable of containing a large amount of water—the hydrocolloid polymer exhibits a high capacity to retain water. Many hydrocolloid polymers include hydrophilic groups such as hydroxyl (OH) and carboxy (COOH) groups, which increase the ability of those polymers to associate with and retain water. A hydrogel, thus, can take the form of a relatively stiff, high-water-content "gel" that includes the hydrocolloid polymer and a relatively large amount of associated water.

Hydrogel systems can also take the form of a more fluid, relatively lower viscosity, non-gelled, liquid, often referred to as a "sol" form. Such hydrogels may be "reversible" or "thermoreversible" meaning that a hydrogel can be capable of being reversibly transformed from a "gel" or "hydrogel" state, to a liquid or "sol" state, based on temperature, e.g., converted between a hydrogel and a sol by cooling and heating. At reduced temperature, a reversible hydrogel takes the form of a relatively stiff, hydrated and flexible gel or hydrogel. When heated, the hydrogel system becomes a free-flowing liquid. If cooled again, the free-flowing liquid form of the hydrogel re-forms as a gel.

Functionally speaking, hydrogel materials have been found to be useful as moisture barriers, in that hydrogel materials can be capable of retaining moisture and flexibility during baking, e.g., during a portion of a baking cycle wherein a dough composition experiences expansion (leavening). A dough piece that includes a surface that includes a hydrogel moisture barrier can be baked, with the moisture barrier remaining hydrated during baking, e.g., until the dough piece achieves a maximum baked volume. The result can be that the dough surface does not become dehydrated during baking, e.g., during expansion, and the dough surface can therefore experience a reduced amount of cracking, tearing, shredding, etc.

In a general sense, the invention takes advantage of a moisture barrier in terms of water-retaining capacity during baking, i.e., water-retaining capacity at relatively high temperatures such as those experienced by a moisture barrier during baking (e.g., from 200 F to 450 F, or from 325 F to 400 F, when baked at an oven set temperature within such ranges). Accordingly, moisture barriers such as hydrogel materials that will be considered to be particularly useful according to the invention will include materials that exhibit relatively high water-retaining properties at elevated temperatures such as those experienced during baking. By binding to water at such elevated temperatures, a moisture barrier can retain moisture and flexibility well into a baking cycle, e.g., at least through a portion of a baking cycle during which a dough composition experiences expansion in volume, e.g., to level of maximum expansion or maximum dough volume.

According to specific embodiments, hydrogels that have been found to exhibit desired water-retention properties during baking may exhibit hysteresis between a setting temperature and a melting temperature. For purposes of the present description and claims, a hydrogel can be considered to exhibit hysteresis if the melting temperature and setting temperature are different by at least 3 degrees Fahrenheit, e.g., at least 10 degrees Fahrenheit. Specific examples of hydrocolloids that exhibit hysteresis include agar, kappa carrageenan, iota carageenan, and furcellaran. These hydrocolloids can be used to produce hydrogels that exhibit a difference in setting and melting temperature of from 40 to 60 degrees Celsius (agar), from 15 to 27 degrees Celsius (kappa carrageenan and furcellaran), and from 2 to 5 degrees Celsius (iota carrageenan).

A setting temperature of a hydrogel can be considered to be a temperature at which a hydrogel in a sol form transforms to a gel as the temperature of the sol is reduced. A melting temperature can be considered to be a temperature at which a hydrogel is considered to transform from a gel to a liquid sol as the gel is heated. According to the invention, a hydrogel that exhibits such a hysteresis between a setting temperature and a melting temperature can be useful as a moisture barrier that can bind water at baking temperatures, allowing the barrier material to function well as a moisture barrier for a dough piece as described herein.

The degree of hysteresis can be any degree that is associated with a hydrogel that provides useful moisture barrier properties, e.g., a temperature difference of at least 3 degrees Fahrenheit. For example, a hydrogel in the form of a hydrocolloid in water, containing a relatively low concentration of hydrocolloid (e.g., 1.5 percent hydrocolloid by weight), may exhibit a difference between setting temperature and melting temperature that is at least 10, 20, or 30 degrees Fahrenheit, e.g., greater than 40 or 50 degrees Fahrenheit. Each of the setting temperature and melting temperature is an understood property of a hydrogel, and each can be determined using a variety of testing methods that measure the rheological properties of the hydrogel directly. An example of a useful measurement can be made using a controlled strain rheometer such as the Advanced Rheometrics Expansion System (ARES), which is capable of measuring storage modulus, loss modulus, and shear modulus, complex viscosity, and normal force, over a temperature range. The melting and setting temperatures can also be determined through the use of dynamic scanning calorimetry (DSC), which measures the thermal transitions of polymer systems.

According to certain specific embodiments of hydrogels, a hydrogel can also exhibit a relatively high melting temperature, e.g., a melting temperature that a moisture barrier will experience during baking, e.g., during an early portion of a baking cycle, such as a melting temperature of at least 140 F, or from 150 to 190 F.

As a specific example of a particular hydrocolloid that can be used to prepare a hydrogel that exhibits hysteresis as described, a hydrogel of agar (e.g., 1.5 percent by weight) can exhibit a setting temperature of about 95 degrees Fahrenheit when cooled from a sol, and a melting temperature of about 185 degrees Fahrenheit when heated from a gel. The sol form of a hydrogel that contains agar (optionally with other hydrocolloids) can exhibit very good water-binding capacity at baking temperatures, thereby resulting in desired water-retaining properties during baking, when used as a moisture barrier for a dough piece as described herein, such as retained flexibility and good ability to retain moisture at a surface of a dough piece.

A moisture barrier can be useful if the moisture barrier can be applied to a dough surface by normal processing techniques; can adhere to the surface during processing, storage (e.g., refrigerated storage or frozen storage) and baking; can form an edible film, coating, or layer following baking; in addition to retaining moisture and remaining flexible during baking. Useful moisture barriers thus may be capable of assuming a liquid state that can be used to form a coating or film on a dough surface of a desired thickness to act as a moisture barrier during baking; should be prepared from food ingredients or ingredients that are suitable for ingestion, i.e., edible; and should be capable of exhibiting useful rheology and adhesion properties to be capable of adhering to a surface of a dough composition with sufficient adhesive and cohesive properties to allow processing such as packaging, transportation, and storage, without being unduly damaged or removed from the dough surface.

The moisture barrier can be prepared from ingredients that are capable of providing desired properties and function of a moisture barrier, as described. A useful ingredient includes a hydrocolloid polymer, which is a polymer that can retain a high amount of water. A hydrocolloid polymer can be a hydrophilic polymer derived from vegetable, animal, microbial, or synthetic origin; a derivative of such a polymer; or another natural or synthetic polymer; that may contain hydroxyl groups or carboxy groups that can become associated with water molecules. Examples of widely used hydrocolloids include starches, modified celluloses, alginate, carrageenan (e.g., in salt form), various tree extrudates (gums such as locust bean gum), agar, pectin, and derivatives of these polymers and synthetic polymers having similar water-retaining capabilities.

According to the invention, a hydrocolloid that has been found to be particularly useful is agar, which is a common natural hydrocolloid derived from seaweed, and which can exhibit a difference in melting and setting temperature (hysteresis) of about 75 to 100 degrees Fahrenheit (40 to 60 C). E.g., a hydrogel containing 1.5 weight percent agar in water can exhibit a setting temperature of about 86 to 95° F., and a melting temperature of about 185° F. Particular useful moisture barriers have been prepared to include hydrogels made of agar; agar and locust bean gum; and agar, locust bean gum, and carrageenan (in salt form).

Other hydrocolloids that may be useful in a moisture barrier of the invention, e.g., in combination with agar, may include other natural gums such as xanthan gum, tragacanth, guar gum, algin, alginate, gelatin, Irish moss, pectin, gum arabic, gum ghatti, gum karaya, and plant hemicelluloses, e.g., corn hull gum. Still other hydrocolloids that may be useful in a moisture barrier of the invention, e.g., in combination with agar, may include polysaccharides and chemically-modified polysaccharides such as a modified cellulose prepared by partial hydrolysis of natural cellulose and subsequent chemical modification by etherification, carboxymethylation, or a similar reaction. Specific examples of chemically-modified polysaccharides useful in the present invention include methylcellulose, ethylcellulose, methyl ethyl cellulose, 2-hydroxyethyl ethylcellulose, 2-hydroxyethyl methylcellulose, 2-hydroxypropylcellulose, 2-hydroxypropymethylcellulose, hydroxyethylcellulose, and similar synthetic cellulose ethers. Other suitable chemically-modified polysaccharides include such ionic alkylcellulose ethers as carboxymethyl cellulose, carboxymethyl ethyl cellulose, carboxymethyl hydroxyethyl cellulose, and their water-soluble salts. The term "chemically-modified polysaccharide" as used herein also refers to semi-synthetic hydrocolloids such as hydroxypropyl alginates and hydroxypropyl starch.

A hydrocolloid may be present in a hydrogel or moisture barrier in any useful amount, e.g., an amount to provide desired moisture-retention and flexibility during a useful portion of a baking cycle, e.g., a portion of a baking cycle during which a dough piece experiences expansion. Useful amounts of hydrocolloid can depend on various factors such as the type of hydrocolloid or hydrocolloids being used; the temperature experienced during baking; coating thickness; amounts of other ingredients in a moisture barrier or hydrogel such as plasticizers or water; the degree of expansion that the dough piece desirably experiences during baking (e.g., in terms of initial volume and final baked volume); the type of dough product that includes the moisture barrier; and the surface properties of the raw and baked dough product such as the degree of tolerance for surface cracking or flaking, and desired coloration upon baking. Specific examples of total amounts of hydrocolloid (single polymers or mixtures or two or more hydrocolloid polymers) that can be used in a hydrogel or moisture barrier can include amounts up to two percent hydrocolloid by weight, e.g., from 0.1 to 1.5 weight percent hydrocolloid based on the total weight of a moisture barrier or a hydrogel composition, e.g., from 0.4 to 1 weight percent hydrocolloid based on the total weight of a moisture barrier or a hydrogel composition.

Specific examples of useful hydrocolloid polymers in a moisture barrier (e.g., in a hydrogel) may include a mixture of agar and locust bean gum in relative amounts by weight of agar:locust bean gum, in the range from 90:10 to 10:90; e.g., from 25:75 to 75:25; or from 40:60-60:40. According to other exemplary moisture barriers, carrageenan may be included in any useful amount relative to other hydrocolloids, such as an amount in the range from about 1 to 25 weight percent carrageenan based on the weight of all hydrocolloid polymers (e.g., agar, locust bean gum, and carrageenan), e.g., from 4 to 10 weight percent carrageenan based on total weight hydrocolloid.

A moisture barrier may include other ingredients, such as a plasticizer, which can be used to increase flexibility of a moisture barrier at baking temperatures. A plasticizer may be a material that acts as a solute for water in a moisture barrier, and thereby competes for water with the hydrocolloid. The plasticizer can thereby cause an effective increase in the concentration of a hydrocolloid, because the plasticizer, by absorbing or associating with water, can cause a hydrocolloid to behave as if the amount of hydrocolloid to water (and therefore the effective concentration of hydrocolloid) were higher. A plasticizer may also impart desirable taste, aroma, or aesthetics, such as a sweet flavor or a glossy appearance or shine. A useful plasticizer can be any material that provides useful flexibility of a moisture barrier, and can include polymeric or alcohol compounds such as sugars, sugar solutions, sugar alcohols, mono- or poly-saccharides (e.g., glycerol), corn syrup, propylene glycol, maltilol, dextrose, sucrose, and hydrogenated starch hydrolysate (HSH) syrups. Sugars such as sucrose and dextrose, as well as glycerol, can provide desired color (browning) upon baking.

A plasticizer may be used in any useful amount, e.g., to improve flexibility of the moisture barrier during baking or to affect flavor or color. The amount of plasticizer used in any particular moisture barrier can be an amount useful to provide desired properties of a moisture barrier as described herein, and can depend on various factors such as the types and amounts of other materials of the moisture barrier (e.g., hydrocolloid); the temperature experienced during baking; coating thickness; the degree of expansion that the dough piece desirably experiences during baking; the type of dough product; and the surface properties of the unbaked and baked dough product. Examples of useful amounts of plasticizer include amounts in the range of from 0.5 to 20 weight percent plasticizer based on total weight of a moisture barrier composition, e.g., from 4 to 8 weight percent plasticizer based on total weight moisture barrier.

A moisture barrier can include an oil (fat), which may be either solid or liquid at room temperature. An oil may be included to provide desired properties as described herein, including flexibility, water-retaining capabilities, flavor, color, etc. In particular, an oil may be used to improve flavor and color of a baked dough product that includes the moisture barrier.

The particular oil included in a moisture barrier may be selected as desired, e.g., on the basis of convenience, flavor, texture, or color of a baked product. For example, edible oils suitable for use in the present invention include liquid and solid oils such as those derived from animals, nuts, flowers, vegetables, or other plants, e.g., a tropical oil, olive oil, canola oil, sunflower seed oil, safflower seed oil, corn oil, peanut oil, walnut oil, soy oil, butter, margarine, etc. Specific examples of a moisture barrier may include oil that is solid at room temperature, such as butter or margarine, which can provide one or more of a desired flavor or color of a baked product.

Specific examples of amounts of oil that can be used in a moisture barrier include amounts in the range of from 1 to 20 weight percent oil based on total weight of a moisture barrier composition, e.g., from 5 to 15 weight percent oil based on total weight moisture barrier.

A moisture barrier can include starch to maintain viscosity at temperatures experienced during baking. Many types of starches are known in the dough and bread-making arts, which may be useful in a moisture barrier as described. According to particular examples a starch can exhibit heat and shear stability such that a moisture barrier or hydrogel that contains the starch will not exhibit an undue reduction in viscosity when heated to baking temperatures. Examples of useful starches can include corn starches, e.g., heat stable modified corn starches such as acetylated corn starch, cross-linked corn starch, and the like. Specific examples of such modified corn starches are commercially available under the trade names PureGel 980 and Purecote 760. The amount of starch used may be a useful amount, e.g., an amount that will provide desired viscosity. Examples of specific amounts of starch that can be used in a moisture barrier include amounts in the range of from 0.2 to 2 weight percent starch based on total weight of a moisture barrier composition, e.g., from 0.5 to 1.5 weight percent starch based on total weight moisture barrier.

A moisture barrier can also include other useful ingredients such as a liquid ingredient that is or includes water. Water may be present in an amount to provide desired properties of flexibility and moisture content, e.g., during baking, to provide a moisture barrier that improves moisture retention at a dough surface during baking, as described. Specific examples of useful amounts of water in a moisture barrier include amounts in the range of from 55 to 95 weight percent water based on total weight of a moisture barrier composition, e.g., from 65 to 85 weight water based on total weight moisture barrier.

According to particular embodiments of the invention, a moisture barrier can be in the form of an emulsion, wherein one phase of the emulsion is a hydrogel as described and one phase is an oil. In particular embodiments, the moisture barrier can be an oil-in-water emulsion, wherein a continuous aqueous phase is in the form of a hydrogel that contains the hydrocolloid, water, starch, and plasticizer. The oil phase is discontinuous within the continuous hydrogel phase. An aqueous phase in the form of a hydrogel provides a moisture barrier with a component that is a relatively stiff gel at or below room temperature, which contributes to adherence of the moisture barrier to a dough composition surface during processing and during refrigerated or frozen storage. At higher temperatures such as those experienced during baking, the hydrogel gradually liquefies but still can adhere to the dough surface instead resist flowing from the dough surface to a degree sufficient to act as an effective moisture barrier. A hydrogel component of a moisture barrier in the form of an oil-in-water emulsion also contributes to water-retention properties, in that the hydrogel can include a portion of water contained by a hydrocolloid. The hydrogel can continue to retain the water during baking for sufficient time to retain moisture in a dough (e.g., at a dough surface), to prevent the dough (e.g., crust) from becoming dehydrated and cracking tearing, flaking, or otherwise becoming damaged during expansion of the dough while baking.

The relative amounts of hydrogel phase and oil phase can be as useful and desired, with specific embodiments of oil-in-water emulsions containing an aqueous phase in the form of a hydrogel, and from 0 up to about 25 percent by weight of a discontinuous oil phase based on the total amount of the emulsion. For example, an oil-in-water emulsion may contain relative amounts of a continuous hydrogel phase to a discontinuous oil phase within the range from 75:25 to 95:5, e.g., from 80:20 to 95:5.

A moisture barrier as described, e.g., containing a hydrogel, optionally in the form of an oil-in-water emulsion as described, can be prepared by methods that will be understood by those of skill. For example, a hydrogel can first be prepared by hydrating a hydrocolloid polymer in water and adding any other desired ingredients such as plasticizer or starch. An emulsion can be formed by combining this aqueous hydrocolloid with an oil to form a two-phase emulsion.

To prepare specific embodiments of the invention that include a hydrocolloid with a high gel melting temperature, the hydrocolloid polymer can be combined with a useful amount of water to hydrate the hydrocolloid polymer, e.g., with heat. As a single example, a hydrogel that is being prepared to include a mixture of agar and locust bean gum, optionally also with an amount of carrageenan, can be prepared by combining the mixture of hydrocolloids with water and heating to at temperature of at least 180 degrees Fahrenheit, e.g., from 180 to 200 F. To this hydrogel, other ingredients can be added as desired, before or after heating, e.g., plasticizer and oil. If desired, oil can be added in a manner that produces an oil-in-water emulsion, such as after preparation of the heated hydrogel, with mixing or agitation to produce a discontinuous oil phase within a continuous hydrogel phase.

Certain embodiments of hydrogels (e.g., as a phase of an oil-in-water emulsion) useful according to the invention can be thermoreversible. For example, hydrogels that are prepared from agar as a hydrocolloid, e.g., in combination with locust bean gum and optionally carrageenan, can be heated to a temperature in the range from 140 to 190 F to produce a liquid sol, and reduced to a temperature of below about 100 F to produce a gel.

In general, a moisture barrier can be applied to a surface of a dough product (e.g., a shaped dough piece) in an amount and manner to form a coating or film that will adhere to the dough surface during processing and storage, and to perform during baking as a moisture barrier. Such a coating may cover an entire dough piece (i.e., the entire surface), or only a portion of a surface such as a top surface. Typically, a desirable moisture barrier (at room temperature or storage temperatures) can be in the form of a continuous, uniform coating or film in an amount that will result in a useful moisture barrier during baking. On the other hand, a moisture barrier can be not so thick to retain too much moisture during baking, which can inhibit leavening and produce a moist, heavy baked dough product interior.

Any useful method may be used to apply a moisture barrier to a dough surface, including known methods of dipping, spraying, waterfall coating, spinning disk, panning, as well as other coating techniques either presently known or developed in the future. A dough piece may be frozen, refrigerated, or at room temperature or higher at a time of applying a moisture barrier to a dough surface. Methods of dipping, waterfall, and spraying, may be useful for a dough composition that is refrigerated. Application of a moisture barrier to a dough surface by dipping or waterfall may be easier if a dough piece is frozen. For moisture barriers that include a hydrogel, e.g., as a component of an oil-in-water emulsion, the moisture barrier can be efficiently applied if the hydrogel phase is in a liquefied sol state, which can involve heating the hydrogel to above a melting temperature.

Examples of specific amounts of moisture barrier that may be useful as applied to a surface of a dough product can depend on factors such as the composition of the moisture barrier itself, including e.g., the use of a specific type and amount of hydrocolloid, plasticizer, oil, etc.; the type of dough product (e.g., a croissant, biscuit, baguette, bread loaf, etc.); whether the dough product is refrigerated or frozen proofed, partially proofed, or partially baked; leavening properties of the dough product such as pre-baked (e.g., raw) volume, desired baked volume, the amount of time of a baking cycle during which the dough experiences expansion, and the particular type of leavening mechanism (e.g., yeast, chemical leavening agent, dough construction (e.g., lamination)); baking conditions such as baking time and temperature; etc. Generally speaking, in view of these and other factors, coating weights of a moisture barrier that are in the range from about 1 to about 25 percent of the weight of dough product, e.g., from about 3 to about 10 of the weight of the dough product, may be found to be useful.

According to certain specific embodiments of the invention, a coating of a moisture barrier can be in the form of an oil-in-water emulsion that includes a hydrogel as a continuous phase. Such a moisture barrier can be in the form of a rigid, semi-rigid, or elastic gel at below the setting temperature of the hydrogel, e.g., at room temperature or at a refrigerated or frozen storage temperature. For such a moisture barrier, a uniform coating that completely covers a dough piece such as a biscuit or croissant, may be useful, at a thickness in the range of 1 to 3 millimeters after cooling to room temperature (for a croissant, biscuit, or other similarly sized and shaped dough product).

As described generally above, embodiments of moisture barriers of the invention, during baking, can retain moisture during a baking cycle for at least a portion of the time during the baking cycle during which a dough product experiences expansion. During this time, the moisture barrier remains at least to some degree hydrated (i.e., retains water) and flexible, to a degree that the moisture barrier can expand along with the expanding dough product and prevent or reduce the amount of moisture that would otherwise evolve from the dough surface during baking. In this way the moisture barrier can improve properties of the baked dough product, including one or more of crust color and texture (e.g., by reduced cracking or flaking at a crust).

According to certain specific embodiments of the invention, a moisture barrier can be in the form of a coating or film of a hydrogel or an emulsion that contains a hydrogel, in the gel form, at temperature such as room temperature or refrigerated or frozen storage temperatures. When the coating, as part of a dough piece, is heated during baking, the gel form of the hydrogel becomes more liquid, e.g., as the hydrogel may transform from a gel to a sol state. The hydrogel remains in a hydrated and flexible sol state during baking, e.g., at least until maximum expansion of the dough product. A moisture barrier should not lose all of a contained amount of moisture too early during baking, because loss of hydration may result in one or more of a loss of flexibility and loss of water-barrier properties. A loss of flexibility can cause a dried film to become hard and stiff, which will inhibit further expansion of the dough being baked, reducing a final baked volume or producing a misshapen appearance. A loss of flexibility of can result in cracking, shredding, flaking, or tearing of dough surface.

A moisture barrier, e.g., hydrogel or emulsion, may stay in contact with the surface of the dough during the entire baking cycle, or, in certain particular embodiments of the invention, leavening gas evolving from the dough composition during baking may cause a portion or substantially all of the flexible moisture barrier to form a bubble that surrounds a portion or much of the dough product during baking.

Eventually, a moisture barrier will lose water and become dehydrated, leaving solids at a surface of the baked dough product. According to certain embodiments of the invention, a moisture barrier can lose a last amount of water only after a dough piece has experienced full expansion during baking, at which time the moisture barrier coating may lose flexibility (dry out by losing all water) without any negative effect. The moisture barrier (e.g., hydrogel, oil-in-water emulsion) can dry out to become a thin solid edible film that covers the dough piece. The color of the dried moisture barrier film can result in a desirable baked dough product color.

The moisture barrier can be used in combination with any type of dough product or dough composition. For example, a useful raw dough composition may be a raw, unproofed or partially proofed, or partially baked, refrigerator or freezer-stable dough that expands (i.e., leavens) during baking. Because many chemically leavened and laminated dough products experience expansion during baking, the moisture barrier can be useful with chemically leavened doughs and laminated doughs. Still, doughs that include yeast as either a flavoring or as a leavening agent (during or before baking), may also be useful according to the invention.

Dough compositions that may particularly benefit from the moisture barrier include dough compositions that experience a significant amount of expansion during a baking cycle. For example, these may be raw, non-pre-proofed doughs, e.g., unproofed or partially proofed doughs, which may be capable of being stored either in a refrigerated or frozen condition. These doughs may generally expand during baking by at least 100 percent of their pre-baked volume (i.e., achieve a volume that is 200 percent of the pre-baked volume.

According to particular embodiments of the invention, greater amounts of expansion can also occur during baking certain dough product and dough types, e.g., expansion of 100 percent during baking, 150 percent, 200 percent (i.e., to three times an unbaked volume), or more. For instance, a dough piece in the form of a raw laminated dough (e.g., croissant) or a raw developed dough may exhibit a raw specific volume in the range from 0.95 to 1.9 cubic centimeters per gram (cc/g), and may be baked to a baked specific volume in the range from 3.5 to 7 cc/g. A dough piece in the form of non-developed raw dough piece (e.g., biscuit), may exhibit a raw specific volume in the range from 0.95 to 1.4 cubic centimeters per gram (cc/g), and may be baked to a baked specific volume in the range from 2.8 to 4 cc/g.

Also according to certain embodiments of the invention, a dough product that includes a moisture barrier as described can be a "freezer-to-oven" dough product that can be stored frozen in an un-proofed or partially-proofed state, and that can be placed frozen into an oven for baking to a useful baked volume, without a thawing or proofing step. Generally, such as freezer-to-oven dough product such as a bread or laminated (e.g., croissant) product may be in the form of a dough piece having a raw specific volume in the range from 0.9 to 1.2 cubic centimeters per gram (cc/g), which may be baked to a baked specific volume in the range from 3 to 6 cc/g.

In general, a dough product according to the invention can include a dough piece that includes a moisture barrier, e.g., as a film or coating, optionally at a frozen or refrigerated temperature for storage. The dough composition itself can be prepared from starting materials that will be understood by those of skill. The dough may include ingredients such as a flour; fat (e.g., a liquid oil or solid fat); leavening agents such as acidic and basic chemical leavening agents or yeast; flavorants; water or other liquid components; and additives. The dough may be laminated, frozen, refrigerated, or packaged in any form of packaging container (e.g., pressurized or non-pressurized). Formulations of useful unbaked dough compositions such as croissants, breads, biscuits, and other chemically leavened or yeast-leavened dough products, are well known to those of skill in the art, and are readily available to the public in commercial cookbooks.

Generally, unbaked dough products suitable for use in the present invention can be prepared from usual ingredients known to those of skill in the art, e.g., flour; water; leavening agent; an oil (fat) such as butter or lard; and other flavorants such as salt. In addition, a dough composition may contain sugar, non-fat milk solids, shortening, gums, surfactants, film-forming proteins, among other possible additives. The dough may further comprise effective amounts of adjuvants such as flavorings, thickeners (e.g., starches and hydrophilic colloids), nutrients (e.g., carbohydrates, proteins, lipids, etc.), antioxidants, antimicrobial agents, eggs and egg solids, acidulants, dough conditioners and enzymes, emulsifiers such as mono- and diglycerides, sodium stearoyl lactylate, vitamins, and the like.

A liquid component such as water, ice, or dairy products such as milk (e.g., condensed milk, non-fat milk, etc.), can be used as desired, in an amount useful for a particular type of dough.

A dough composition can be caused to expand (leaven) by any leavening mechanism, such as by one or more of the effects of: entrapped gas such as entrapped carbon dioxide, entrapped oxygen, or both; a laminated dough structure; by action of chemical leavening agents; or by action of a biological agent such as a yeast. Thus, a leavening agent may be an entrapped gas such as layers or cells (bubbles) that contain carbon dioxide, water vapor, or oxygen, etc.; any type of yeast (e.g., cake yeast, cream yeast, dry yeast, etc.); or a chemical leavening system, e.g., containing a basic chemical leavening agent and an acidic chemical leavening agent that react to form a leavening gas such as carbon dioxide.

Examples of acidic chemical leavening agents are generally known in the dough and bread-making arts, with examples including sodium aluminum phosphate (SALP), sodium acid pyrophosphate (SAPP), monosodium phosphate, monocalcium phosphate monohydrate (MCP), anhydrous monocalcium phosphate (AMCP), dicalcium phosphate dihydrate (DCPD), glucono-delta-lactone (GDL), as well as a variety of others. Optionally, an acidic chemical leavening agent for use according to the invention, can be encapsulated.

Examples of basic chemical leavening agents include many that are generally known in the dough and baking arts, such as soda, i.e., sodium bicarbonate ($NaHCO_3$), potassium bicarbonate ($KHCO_3$), ammonium bicarbonate ($NH_4HCO_3$), etc. A basic chemical leavening agent may also be encapsulated, if desired.

Non-fat milk solids that can be used in the compositions of this invention are the solids of skim milk and include proteins, mineral matter and milk sugar. Other proteins such as casein, sodium caseinate, calcium caseinate, modified casein, sweet dairy whey, modified whey, and whey protein concentrate can also be used in these doughs.

Dry or liquid flavoring agents, fruit and vegetables may also be added to the formulation. These include mustard, potatoes, anchovies, capers, olives, bacon, cocoa, vanilla, chocolate, butter flavor, coconut, peppermint, pineapple, cherry, nuts, spices, salts, poppy or sesame seeds, onion, garlic, cheese, tomatoes, scallions, oat bran, jalapeno peppers, cinnamon, raisins, chocolate chips, apples, berries, bananas, walnuts, lemon and flavor enhancers, among others.

Acidulants commonly added to foods include lactic acid, citric acid, tartaric acid, malic acid, acetic acid, phosphoric acid, and hydrochloric acid.

Dough conditioners commonly added to dough products include potassium sorbate, L-cysteine hydrochloride, mono- and diglycerides, polysorbates, sodium bisulfite, sodium stearoyl lactylate, ascorbic acid and diacetyltartaric acid esters of mono- and di-glycerides (DATEM). These conditioners serve to add functionality, reduce mix times and provide softness to the doughs to which they are added.

Particular embodiments of the invention relate to laminated dough products, such as croissants. Dough composition useful to produce a laminated dough product are known, and can include ingredients as described above. Exemplary formulations of a laminated dough product can be prepared by combining ingredients of a dough composition within the ranges listed below, and then laminating the dough with fat within the listed range based on the total weight of the laminated dough piece (i.e., the combined weight of the layers of laminated dough composition and fat).

| Ingredient | Weight percent of total dough composition |
|---|---|
| Flour | 42 to 50 |
| Water | 28 to 34 |
| Fat (mixed into the dough composition) | 4 to 8 |
| Yeast | 2 to 4 |
| Sugar | 2 to 4 |
| Salt | 0.5 to 1.5 |
| | weight percent of total laminated dough piece* |
| Fat | 20 to 29 |

(*as fat layers inserted by lamination between layers of dough, the amount being based on total weight of the dough piece, including weight of the dough layers plus the weight of the fat layers)

Particular processing steps are known and can be conventional in nature, such as mixing techniques and times, temperatures, and speeds; laminating techniques and other processing steps such as rounding, cutting, shaping, sizing, folding, filling, etc.

Exemplary embodiments of the invention are described herein. Variations on the exemplary embodiments will become apparent to those of skill in the relevant arts upon reading this description. The inventors expect those of skill to use such variations as appropriate, and intend for the invention to be practiced otherwise than specifically described herein. Accordingly, the invention includes all modifications and equivalents of the subject matter recited in the claims as permitted by applicable law. Moreover, any combination of the above-described elements in all possible variations thereof is encompassed by the invention unless otherwise indicated.

A dough composition was prepared according to the following formulation (as described in U.S. Pat. No. 6,579,554).

| Ingredient | Weight % |
|---|---|
| Flour | 46.00 |
| Water | 33.66 |
| Yeast | 2.90 |
| Margarine | 8.10 |
| Sugar | 3.75 |
| Vital wheat gluten | 3.30 |
| Salt | 0.95 |
| Pectin | 0.75 |
| Guar gum | 0.30 |
| Sodium Stearoyl Lactylate | 0.18 |
| DATEM | 0.11 |
| Ascorbic acid | 0.003 |

4440 grams of dough composition was combined with 1600 grams of margarine in a lamination process, and the laminated dough was cut and rolled into croissants.

A hydrogel was prepared and combined with oil to prepare a moisture barrier that was in the form of an oil-in-water emulsion, according to the following ingredients and method.

A hydrogel was formed:

| Ingredient | Grams |
|---|---|
| Water | 250 |
| Maltilol | 22.5 |
| Locust bean gum | 1 |

-continued

| Ingredient | Grams |
|---|---|
| Agaroid RS 575 (agar/carrageenan) | 1 |
| Sodium Stearoyl Lactylate | 2.5 |
| Acetylated corn starch | 3.75 |
| Dextrose | 12.5 |

The hydrogel was combined with 39 grams of butter to produce an emulsion. The overall preparation was carried out according to the following:
1. Preblend dry ingredients to uniformity.
2. Place water and in pan on stovetop and blend until Maltilol is solubilized in water.
3. Slowly disperse dry blend into Maltilol solution.
4. Apply high shear mixing (bench scale high shear impeller) until all dry preblend is uniformly incorporated. Apply heat and mix under high shear until a temperature of 190 F is reached.
5. Heat butter until liquid and add liquid butter under high shear to the heated blend. Mix until butter is uniformly emulsified, and maintain at a temperature of from 180 to 195 degrees F.

Application of Barrier Material to Raw Croissant

The composition was applied when heated, at an amount of from 5 to 15 percent by weight of the weight of the dough piece, e.g., 10 grams (±2 grams) for a 100 g raw dough croissant. Upon application, the composition formed a gel. The dough with composition was then frozen and stored at −10° F.

The croissants were tested for frozen storage stability by exposing to 21 freeze-thaw cycles between 0 degrees and 20 degrees Fahrenheit. When baked, the croissants that included the moisture barrier exhibited baked properties that were more desirable in comparison to similar croissants that did not include the moisture barrier, e.g., improved color and surface appearance, including a reduced degree of surface tearing and shredding for the coated croissants.

The invention claimed is:

1. A method of preparing a dough composition, the method comprising
   providing a dough piece,
   applying moisture barrier to a surface of the dough piece, the moisture barrier comprising a hydrogel that includes hydrocolloid and water, and
   baking the dough piece to cause the dough piece to expand, wherein the moisture barrier remains hydrated during baking at least until the dough piece achieves a maximum volume during baking.

2. The method of claim 1 wherein the dough composition is selected from the group consisting of: a raw unproofed dough composition, a partially- proofed dough composition, and a partially-baked dough composition.

3. The method of claim 1 wherein the hydrocolloid is selected from the group consisting of agar, locust bean gum, and combinations thereof.

4. The method of claim 3 wherein the hydrogel comprises carrageen.

5. The method of claim 1 comprising baking the dough piece at a baking temperature in the range from 250 to 400 degrees Fahrenheit.

* * * * *